(No Model.)
A. G. NEWMAN, J. A. JOHNSON, J. H. SWEDLUND & C. WILLIAMS.
POWER CONVERTER.
No. 577,445. Patented Feb. 23, 1897.
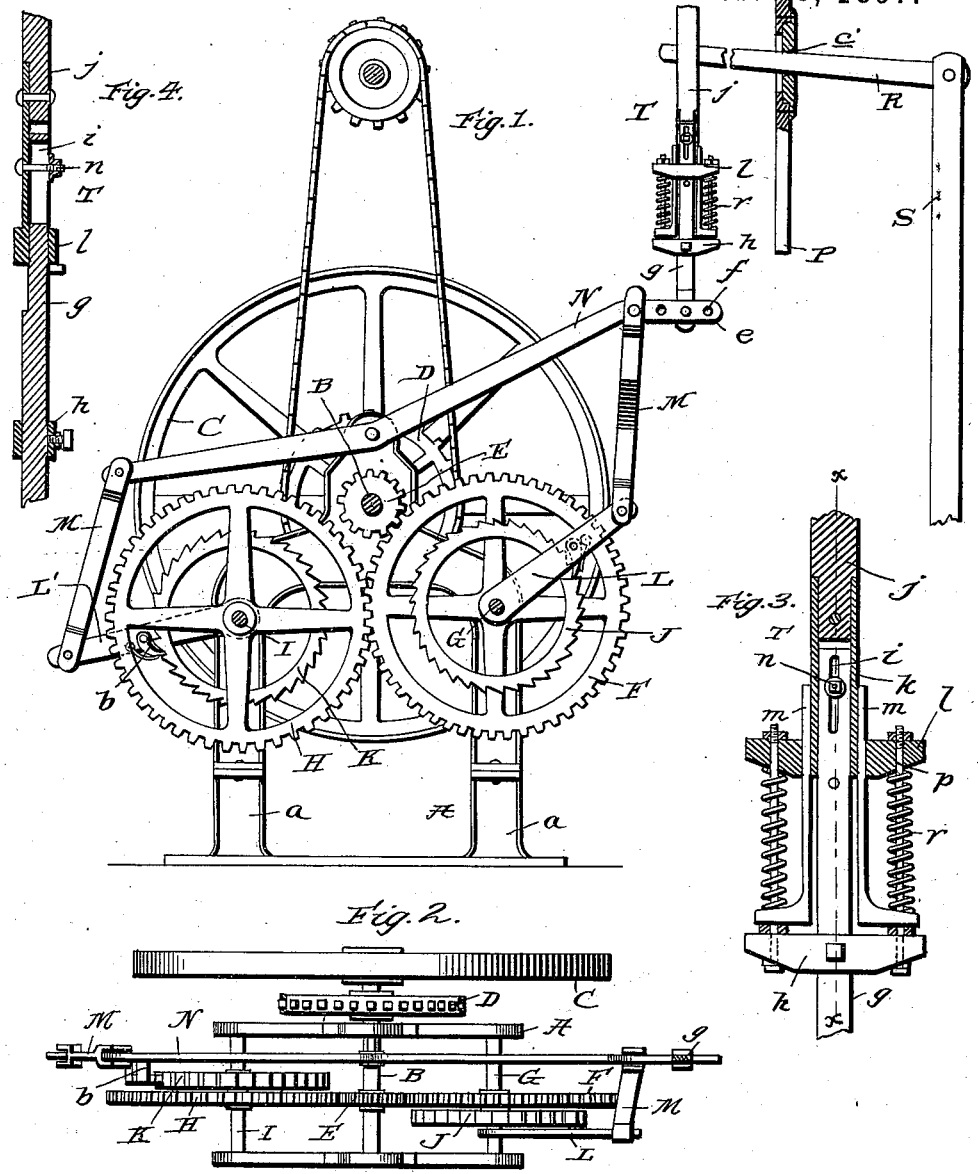
Witnesses:
Inventors
A. G. Newman
John A. Johnson
J. H. Swedlund &
C. Williams
By James J. Sheehy
Attorney

UNITED STATES PATENT OFFICE.

ALBERT G. NEWMAN, JOHN A. JOHNSON, JOSEPH H. SWEDLUND, AND CHRIS WILLIAMS, OF STRATFORD, IOWA.

POWER-CONVERTER.

SPECIFICATION forming part of Letters Patent No. 577,445, dated February 23, 1897.

Application filed October 13, 1896. Serial No. 608,752. (No model.)

*To all whom it may concern:*

Be it known that we, ALBERT G. NEWMAN, JOHN A. JOHNSON, JOSEPH H. SWEDLUND, and CHRIS WILLIAMS, citizens of the United States, residing at Stratford, in the county of Hamilton and State of Iowa, have invented certain new and useful Improvements in Power-Converters; and we do declare the following to be a full, clear, and exact description of the invention, such as will enable others skilled in the art to which it appertains to make and use the same.

This invention relates to improvements in that class of power-converters which are designed more especially for use in conjunction with wind-engines for converting the reciprocatory motion of the pump-rod into rotary motion suitable for running small machinery; and its novelty and advantages will be fully understood from the following description and claim when taken in conjunction with the annexed drawings, in which—

Figure 1 is a vertical longitudinal section of our improved power-converter. Fig. 2 is a plan view of the same. Fig. 3 is an enlarged detail elevation, with parts in section, of the device for taking up the jerk of the pump-rod and preventing the transmission of the same to the converter; and Fig. 4 is a vertical transverse section taken in the plane indicated by the dotted line $x\,x$ of Fig. 3.

In the said drawings similar letters designate corresponding parts in all of the several views, referring to which—

A indicates the main iron frame of our improved machine, which preferably comprises the two uprights or standards $a$, and B indicates the transverse drive-shaft, which is journaled in suitable bearings in the standards or uprights $a$, as illustrated. This shaft B is provided with one or more balance-wheels C and with one or more sprocket or other suitable gear wheels D for connecting it with the machinery to be driven, and it is also provided at a point between the standards $a$ with a pinion E, as better shown in Fig. 1. The said pinion E meshes with a gear-wheel F, mounted on a transverse shaft G, and the said wheel F in turn meshes with a gear-wheel H, mounted on a transverse shaft I. These gear-wheels F H are provided with circular ratchet-rims J K, which are preferably formed integral therewith, and the said ratchet-rims, which have their teeth disposed in opposite directions, are designed and adapted to be engaged by the spring-pressed pawls $b$, carried by levers L L', which are fulcrumed on the shafts G I, as illustrated.

The levers L L' are connected by links M with a lever N, which is fulcrumed at an intermediate point of its length, and consequently it will be seen that when the lever N is rocked in one direction the pawl of the lever L, engaging the teeth of ratchet-rim J, will rotate the gear-wheel F, while the pawl of the lever L' will ride over the teeth of the ratchet-rim K of the gear-wheel H, and when the lever N is rocked in the opposite direction the pawl of the lever L', engaging the teeth of the ratchet-rim K, will rotate the gear-wheel H, while the pawl of the lever L will ride over the teeth of the ratchet-rim of the wheel F. As the gear-wheel F meshes with the pinion E and the gear-wheel H with said wheel F it will be readily observed that the rotation of the pinion E, and consequently the rotation of the drive-shaft on which said pinion is fixed, will be continuous so long as the rocking of the lever N is continued.

P indicates the pump-rod of a wind-engine, and R indicates a lever which is fulcrumed at one end upon a suitable support S and extends loosely through an opening $c$ in the rod P or is otherwise suitably connected to the same. This lever R is loosely connected to a device T, and the said device T, which is designed to take up the jerk of the rod P and prevent the transmission of the same to the converter, is pivotally or loosely connected in turn to the extended portion $e$ of the lever N, the said extending portion being provided at intervals with apertures $f$, so that the device T may be connected at various points, according to the length of stroke desired.

The device T is better illustrated in Figs. 3 and 4 of the drawings, and it preferably comprises the lower rod-section $g$, which is connected to the lever N and is provided with a cross-bar $h$ and with a longitudinal transversely-disposed slot $i$; the upper rod-section $j$, which is provided at its lower end with the casting $k$, receiving the section $g$ and having the enlargement $l$ at its lower end; the guides $m$, which bear upon the bar $h$ of the rod-section $g$ and extend loosely through the enlargement $l$ of the casting $k$; the bolt $n$, which takes through the casting $k$ and the slot $i$ of the rod-section $g$; the bolts $p$, which extend loosely through the guides $m$, the enlargement $l$ of the casting $k$, and the cross-bar $h$ of the rod-section $g$, and the coiled springs $r$, which surround the bolts $p$ and are interposed between the enlargement $l$ and the lower portions of the guides $m$, as illustrated. In virtue of this construction it will be seen that when the pump-rod, and consequently the lever R and the upper section $j$ of the device T, is moved downwardly the casting $k$ of the section $j$ will move downward on the bolts $p$ and will be cushioned by the springs $r$ before motion will be transmitted to the lower rod-section $g$ and the lever N of the converter. This cushioning of the casting $k$ of the rod-section $j$ will take up all the jerk and shock incident to the downward stroke of the pump-rod and will prevent the transmission of the same to the converter, which is an important advantage.

On the upstroke of the pump-rod the bar $h$ of the rod-section $g$ and the guides $m$ will be cushioned against the springs $r$, and the jerk and shock will also be taken up and prevented from being transmitted to the converter, thus insuring continuous smooth and regular running of the same. The guides $m$, as will be readily appreciated, materially strengthen the connection of the rod-sections $g\,j$ by holding said sections in perfect alinement and preventing any lateral deflection thereof.

It will be observed from the foregoing that when the pump-rod P is reciprocated by the wind-wheel (not illustrated) the drive-shaft B of the converter will be continuously and regularly rotated, and power may therefore be taken from the same to run light machinery, such as grist-mills, corn-huskers, feed-cutters, and the like.

It will also be observed that the construction of our improved converter is very cheap and simple and that the manner of connecting it with the pump-rod of a windmill, while simple and cheap, is highly advantageous, as it insures the smooth rotation of the converter and the consequent smooth running of the machine which the converter drives.

We have in some respects specifically described the construction and relative arrangement of the parts of our improvement in order to impart a full, clear, and exact understanding of the same. We do not desire, however, to be understood as confining ourselves to such specific construction and arrangement, as such changes or modifications may be made in practice as fairly fall within the scope of our invention.

Having described our invention, what we claim is—

The combination of a reciprocating pump-rod, a power-converter comprising a main frame, a drive-shaft journaled therein, a lever fulcrumed on the main frame and mechanism intermediate of said lever and the drive-shaft for rotating said shaft when the lever is rocked, and the device T, comprising the lower rod-section connected with the lever and having a cross-bar $h$, and also having a longitudinal transversely-disposed slot $i$, the upper rod-section connected with the pump-rod and provided at its lower end with the casting $k$, receiving the lower rod-section and having the enlargement $l$, at its lower end, the guides $m$, bearing upon the bar $h$, of the lower rod-section and extending loosely through the enlargement $l$, of the casting, the bolt extending through the casting $k$, and the slot $i$, of the lower rod-section, the bolts extending loosely through the guides $m$, the enlargement $l$, of the casting $k$, and the cross-bar $h$, of the lower rod-section and the coiled springs surrounding said bolts and interposed between the enlargement $l$, and the lower portions of the guides $m$, substantially as specified.

In testimony whereof we affix our signatures in presence of two witnesses.

ALBERT G. NEWMAN.
JOHN A. JOHNSON.
JOSEPH H. SWEDLUND.
CHRIS WILLIAMS.

Witnesses:
JOHN SODER,
JONAS CANNON.